(12) United States Patent
Miyanaga

(10) Patent No.: US 10,744,677 B2
(45) Date of Patent: Aug. 18, 2020

(54) HOLE DRILLING DEVICE FOR FORMING EXPANDED-DIAMETER HOLE PORTION

(71) Applicant: KABUSHIKI KAISHA MIYANAGA, Miki-shi, Hyogo (JP)

(72) Inventor: Masaaki Miyanaga, Miki (JP)

(73) Assignee: KABUSHIKI KAISHA MIYANAGA, Miki-Shi, Hyogo (JP)

( * ) Notice: Subject to any disclaimer, the term of this patent is extended or adjusted under 35 U.S.C. 154(b) by 0 days.

(21) Appl. No.: 16/315,253

(22) PCT Filed: Jul. 4, 2017

(86) PCT No.: PCT/JP2017/024530
§ 371 (c)(1),
(2) Date: Jan. 4, 2019

(87) PCT Pub. No.: WO2018/008645
PCT Pub. Date: Jan. 11, 2018

(65) Prior Publication Data
US 2019/0160707 A1 May 30, 2019

(30) Foreign Application Priority Data
Jul. 7, 2016 (JP) .................. 2016-134794

(51) Int. Cl.
B28D 1/14 (2006.01)
B23B 41/00 (2006.01)
(Continued)

(52) U.S. Cl.
CPC ............... B28D 1/14 (2013.01); B23B 41/00 (2013.01); E21B 7/28 (2013.01); E21B 10/32 (2013.01);
(Continued)

(58) Field of Classification Search
CPC ........ E21B 10/32; E21B 10/62; E21B 10/325; E21B 7/28
See application file for complete search history.

(56) References Cited

U.S. PATENT DOCUMENTS 4,635,737 A 1/1987 Miyanaga

FOREIGN PATENT DOCUMENTS

| JP | 03002491 A | 5/1989 |
|---|---|---|
| JP | H05074718 U | 10/1993 |

(Continued)

Primary Examiner — Tara E Schimpf
Assistant Examiner — Manuel C Portocarrero
(74) Attorney, Agent, or Firm — Alleman Hall Creasman & Tuttle LLP

(57) ABSTRACT

A hole drilling device for forming an expanded-diameter hole portion at an inner bottom part of a mounting hole includes: a shaft including a contact surface and a tapered surface, and a cutter including a stopper provided on a side surface of the cutter, the stopper coming into contact with a surface of a drilling object. The cutter is movable between a first position and a second position. When the cutter is in the first position, the contact surface is in contact with the inner bottom part of the mounting hole, and the stopper is away from the surface of the drilling object. When the cutter is in the second position, the cutter has been pushed in forward from the first position, the cutting bit has protruded laterally from the tapered surface, and the stopper is in contact with the surface of the drilling object.

6 Claims, 6 Drawing Sheets

(51) Int. Cl.
*E21B 10/32* (2006.01)
*E21B 7/28* (2006.01)
*E21B 10/62* (2006.01)
*E02D 5/34* (2006.01)

(52) U.S. Cl.
CPC ............ *E21B 10/325* (2013.01); *E21B 10/62* (2013.01); *E02D 5/34* (2013.01)

(56) References Cited

FOREIGN PATENT DOCUMENTS

| | | | | |
|---|---|---|---|---|
| JP | H07276352 | A | 10/1995 | |
| JP | H1177662 | A | 3/1999 | |
| JP | 5502684 | B2 | 3/2014 | |
| KR | 1020080066738 | A | 7/2008 | |
| WO | WO-2015025492 | A1 * | 2/2015 | ............ B23B 51/08 |

* cited by examiner

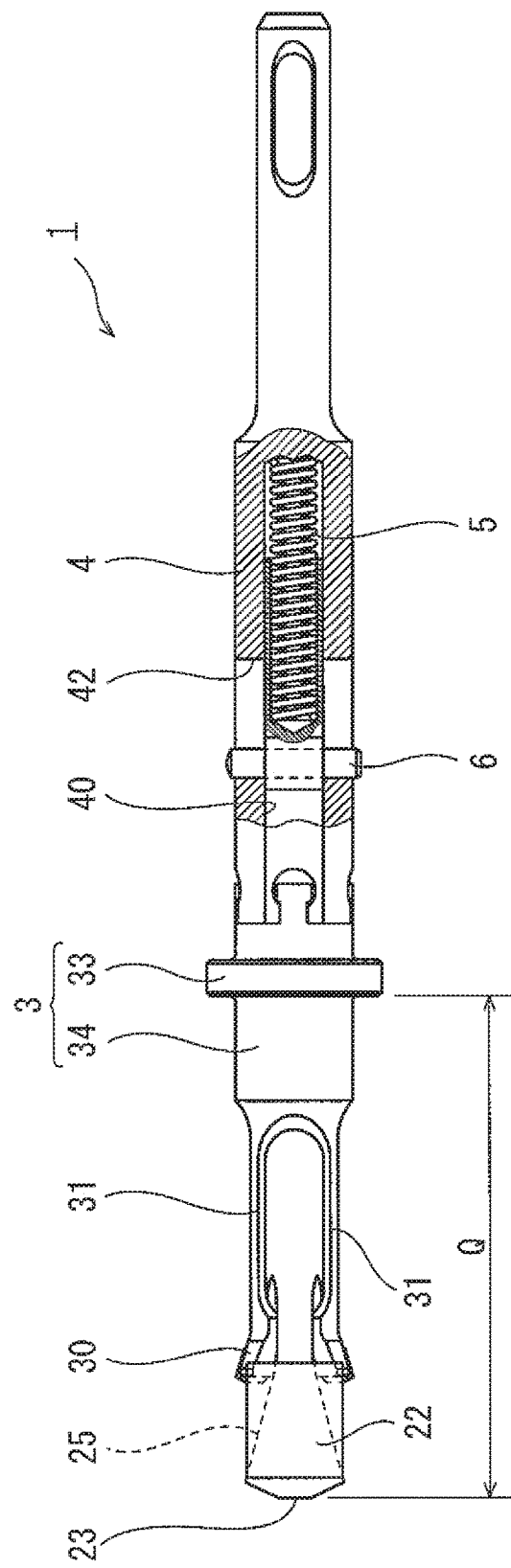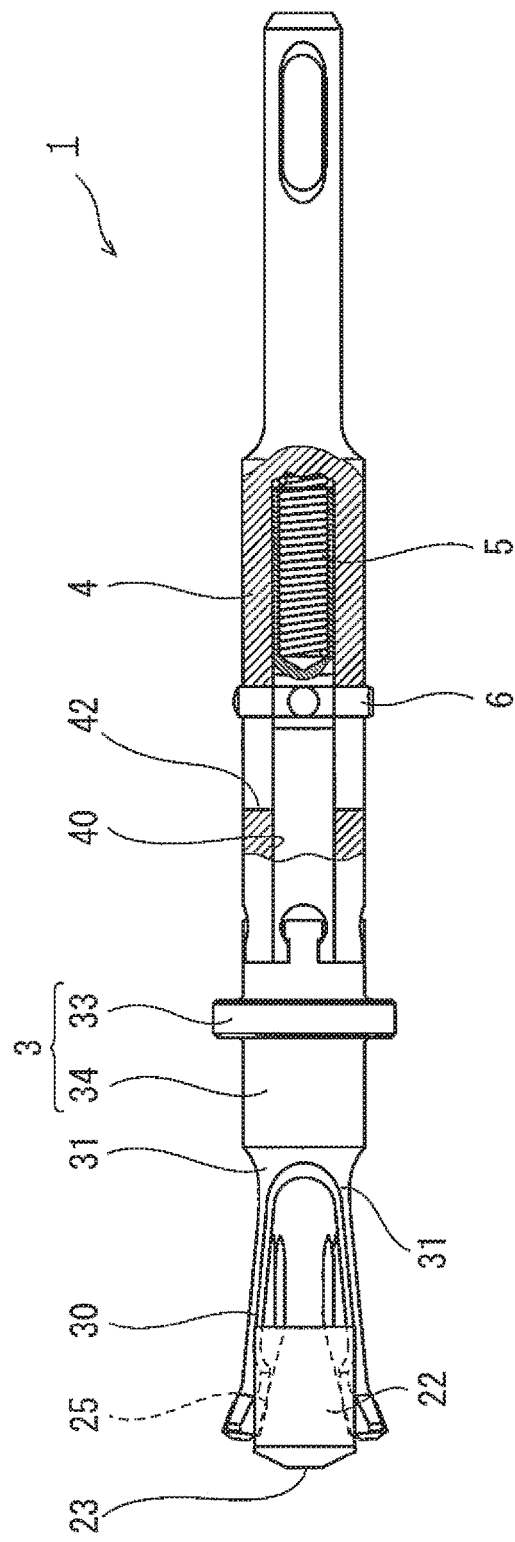

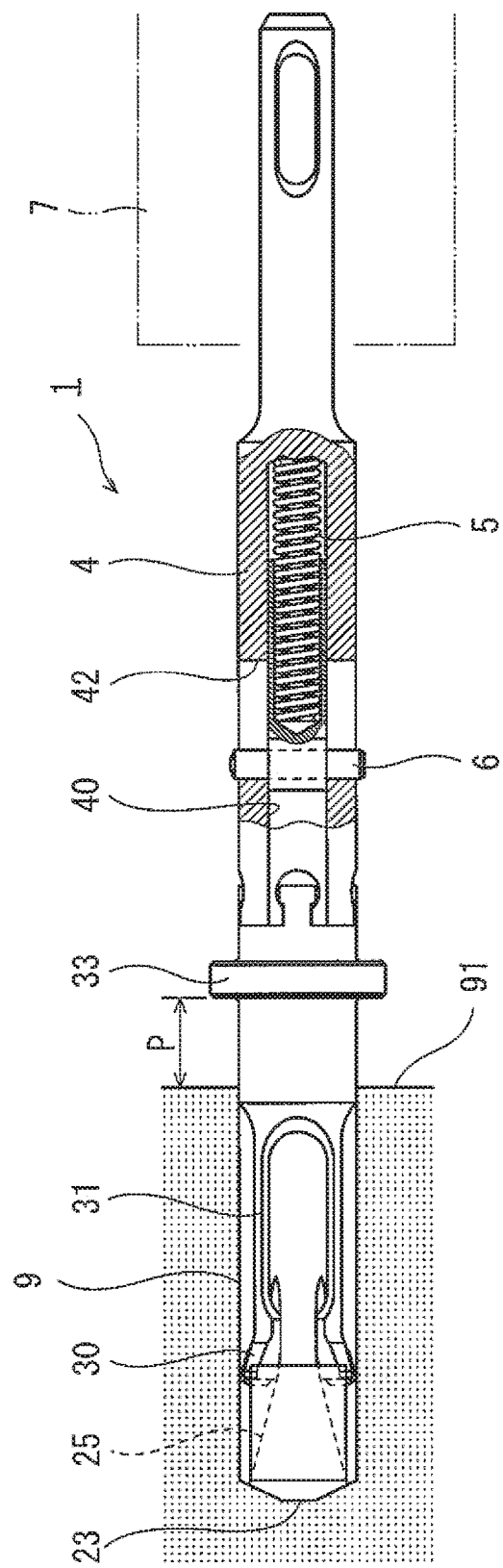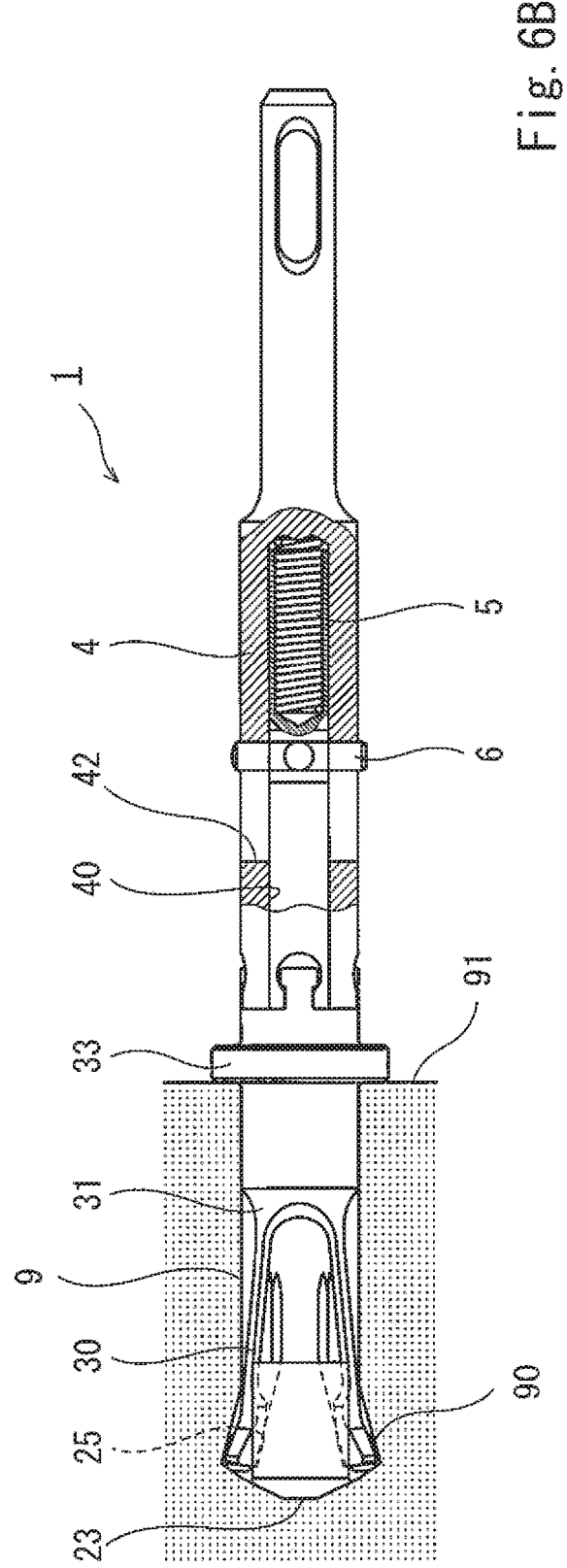

HOLE DRILLING DEVICE FOR FORMING EXPANDED-DIAMETER HOLE PORTION

TECHNICAL FIELD

The present invention relates to a hole drilling device for forming an expanded-diameter hole portion having an expanded diameter at the inner part of a bottomed hole that is formed in advance in a drilling object.

BACKGROUND ART

In order to mount some component, structure, or the like on a drilling object such as a concrete wall, the following technique is widely used: fix an anchor bolt in a bottomed mounting hole formed in the concrete wall surface; and fit the component, structure, or the like to the anchor bolt. The mounting hole includes a thin hole portion and an expanded-diameter hole portion. The thin hole portion is open at the wall surface, and the expanded-diameter hole portion is formed at the inner bottom part of the thin hole portion. The anchor bolt has an expanded-diameter head portion, and the head portion is fitted in the expanded-diameter hole portion.

Various devices for drilling such a mounting hole have been proposed. The applicant of the present application also discloses one of such devices in Patent Literature 1. The device disclosed in Patent Literature 1 is configured as follows: tapered surfaces are formed on the circumferential surface of an expanded-diameter guide provided at the distal end portion of the device; and expanded-diameter bits are slidably fitted to the expanded-diameter guide. After the expanded-diameter guide is inserted in a thin hole, the expanded-diameter bits in a rotating state are pushed in toward the inner part of the thin hole. While being pushed in, the expanded-diameter bits spread out laterally along the tapered surfaces, and the expanded-diameter bits form an expanded-diameter hole portion with their rotating motion at the inner part of the thin hole.

CITATION LIST

Patent Literature

PTL 1: Japanese Patent No. 5502684

SUMMARY OF INVENTION

Technical Problem

At the time of drilling the expanded-diameter hole portion with the hole drilling device disclosed in Patent Literature 1, whether or not the formation of the expanded-diameter hole portion has been completed is not readily visually recognizable from the outside of the drilling object. That is, a worker performing the hole drilling work is unable to visually check from the outside of the drilling object whether or not the expanded-diameter hole portion has been formed.

An object of the present invention is to provide a hole drilling device that makes it possible to visually check whether or not the formation of an expanded-diameter hole portion has been completed.

Solution to Problem

A hole drilling device for forming an expanded-diameter hole portion at an inner bottom part of a bottomed mounting hole formed in a drilling object. The hole drilling device includes: a shaft including a contact surface and a tapered surface, the contact surface being formed on a front end portion of the shaft and coming into contact with the inner bottom part of the mounting hole, the tapered surface being formed on a side surface of the front end portion of the shaft and expanding in diameter toward the contact surface; and a cutter including a stopper provided on a side surface of the cutter, the stopper coming into contact with a surface of the drilling object, the cutter including a cutting bit formed on a front end portion of the cutter, the cutter being fitted to the shaft such that the cutter is slidable in a forward-rearward direction, the cutting bit contacting the tapered surface and protruding laterally from the tapered surface when the cutter slides forward along the shaft. The stopper, which comes into contact with the surface of the drilling object when the cutter slides forward along the shaft, is provided on the side surface of a rear end portion of the cutter.

The cutter is movable between a first position and a second position. When the cutter is in the first position, the contact surface of the shaft is in contact with the inner bottom part of the mounting hole, and the stopper is away from the surface of the drilling object. When the cutter is in the second position, the cutter has been pushed in forward from the first position, the cutting bit has protruded laterally from the tapered surface, and the stopper is in contact with the surface of the drilling object.

Advantageous Effects of Invention

In the second position, in which the stopper is in contact with the surface of the drilling object, it is recognized that the cutting bit of the cutter has protruded laterally from the tapered surface, and that the expanded-diameter hole portion has been formed. Since the stopper being in contact with the surface of the drilling object is visually recognizable, a worker performing the hole drilling work can visually check from the outside of the drilling object whether or not the expanded-diameter hole portion has been formed.

BRIEF DESCRIPTION OF DRAWINGS

FIGS. 5A and 5B are partially cutaway side views of the hole drilling device, and FIG. 5A shows the hole drilling device in an unused state, whereas FIG. 5B shows the state of the hole drilling device at the time of forming an expanded-diameter hole portion.

FIGS. 6A and 6B are partially cutaway side views of the hole drilling device, and FIG. 6A shows the hole drilling device inserted in a mounting hole, whereas FIG. 6B shows a state where the formation of the expanded-diameter hole portion has been completed.

DESCRIPTION OF EMBODIMENTS

Figure 7A:
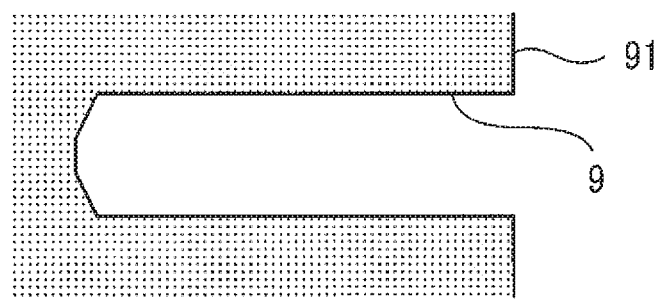
FIG. 7A shows the mounting hole before the expanded-diameter hole portion is formed therein.
Figure 7B:
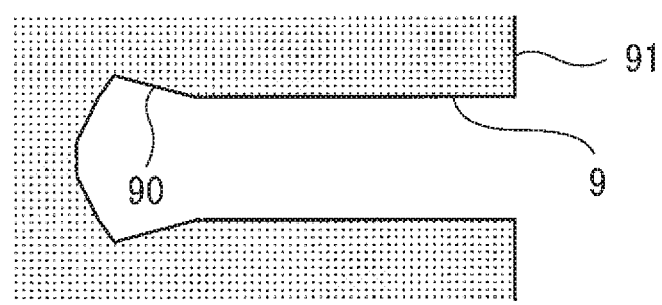
FIG. 7B shows the mounting hole after the expanded-diameter hole portion is formed therein.

Hereinafter, one embodiment of the present invention is described in detail with reference the drawings. First, a hole formed by a hole drilling device of the present invention is described. As shown in FIG. 7A, first, a bottomed cylindrical mounting hole 9 is formed in a drilling object 91, such as a concrete wall, by a general drill. The hole drilling device according to the present embodiment is a hole drilling device for forming an expanded-diameter hole portion 90 at the inner bottom part of the mounting hole 9 as shown in FIG. 7B. An anchor bolt (not shown) having an expanded head portion is inserted into the mounting hole 9, in which the expanded-diameter hole portion 90 is formed. As a result, the pull-out strength of the anchor bolt increases. Such a bolt-retaining effect is high particular in a case where the drilling object 91 is, for example, the ceiling of a structure. In the description below, the direction toward the inner part of the mounting hole 9 is defined as forward, and the direction reverse thereto is defined as rearward.

Figure 1:
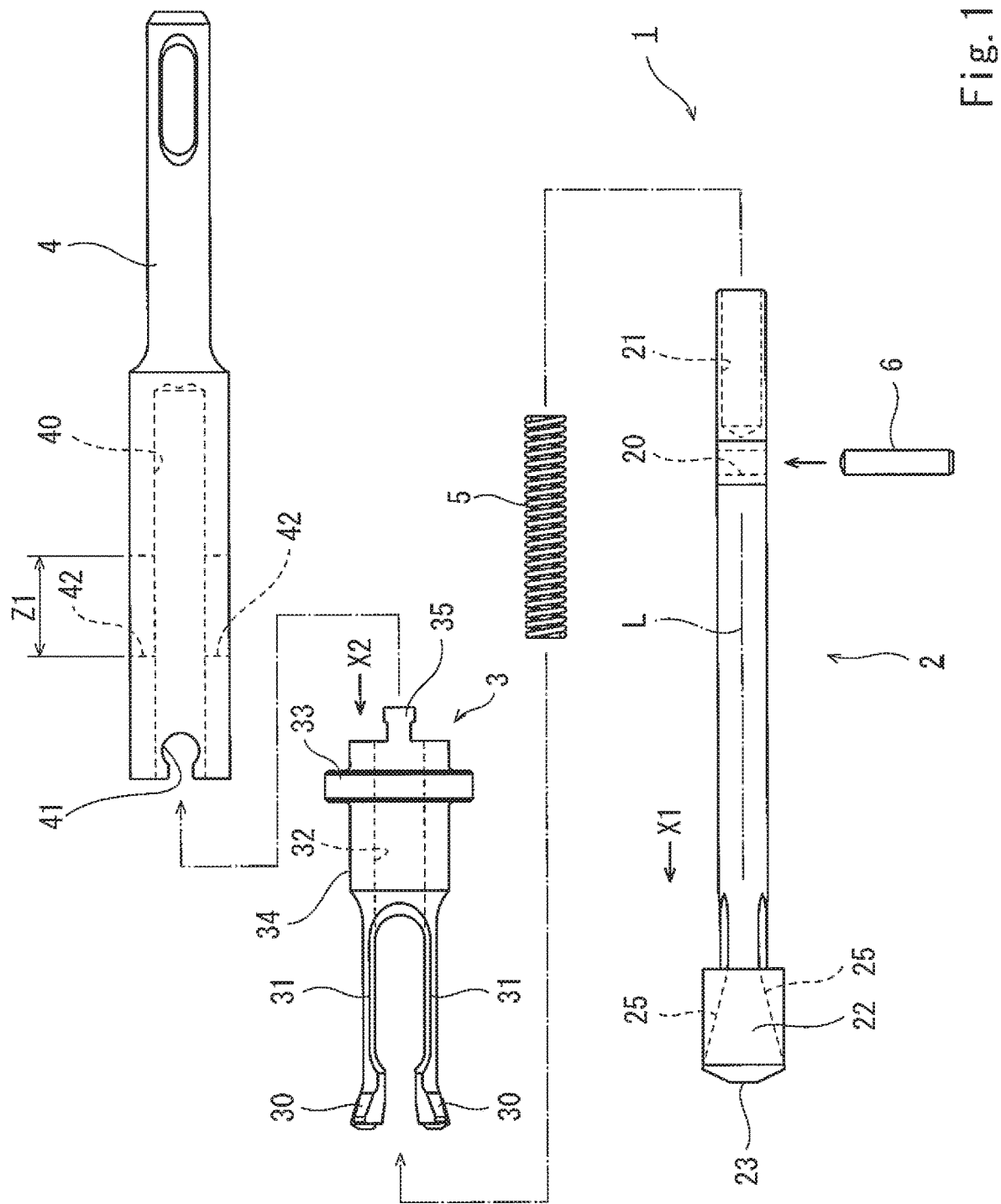
FIG. 1 is an exploded side view of a hole drilling device according to one embodiment of the present invention.

FIG. 1 is an exploded side view of a hole drilling device 1 according to the present embodiment. The hole drilling device 1 includes: an elongated shaft 2 including an expanded-diameter guide block 22 provided at the front end portion of the elongated shaft 2; a cutter 3 including a through-hole 32, which is formed in the central portion of the cutter 3 and in which the shaft 2 is fitted, the cutter 3 including a plurality of cutting bits 30 formed on the front end portion (distal end portion) of the cutter 3; and a shank 4 coupled to the cutter 3, the shank 4 including an insertion hole 40 formed therein, the insertion hole 40 communicating with the through-hole 32 and receiving the shaft 2. That is, the shaft 2 is passed through the cutter 3 and the shank 4, and the cutter 3 and the shank 4 are externally attached to the shaft 2. A rotation motor is connected to the rear end portion of the shank 4, and the shaft 2, the cutter 3, and shank 4 are driven to rotate about a longitudinal axis L coaxially. It is assumed herein that the drilling object 91 is concrete or the like. Therefore, the cutter 3 is made of, at least, a metal. As one example, the cutter 3 is made of cemented carbide.

Figure 2:
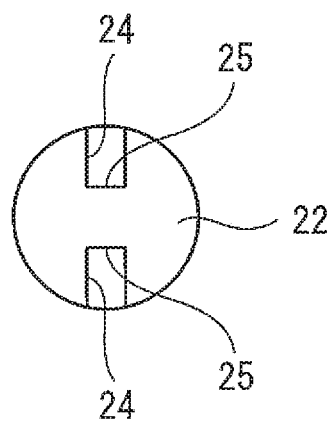
FIG. 2 is a view of a shaft of FIG. 1 as seen in an X1 direction.

The shaft 2 includes a spring receiving hole 21 formed therein. The spring receiving hole 21 is formed in the rear end portion of the shaft 2, and extends in the forward-rearward direction. The shaft 2 further includes a through-hole 20 formed therein. The through-hole 20 is formed at a position forward of the spring receiving hole 21, and extends orthogonally to the longitudinal axis L. A contact surface 23, which comes into contact with the inner bottom part of the mounting hole 9, is formed on the front surface of the expanded-diameter guide block 22. Two recessed grooves 24, which receive the respective cutting bits 30, are formed in the side surface of the expanded-diameter guide block 22, such that the two recessed grooves 24 are provided at opposite positions (see FIG. 2). It should be noted that the number of recessed grooves 24 is the same as the number of cutting bits, and the number of recessed grooves 24 is not limited to two. The bottom surfaces of the respective recessed grooves 24 form tapered surfaces 25, which expand toward the contact surface 23, and the inner side of each cutting bit 30 contacts a corresponding one of the tapered surfaces 25. That is, the cutting bits 30 slide on the respective tapered surfaces 25 while the forward-rearward movement of the cutting bits 30 is guided by the recessed grooves 24. The sliding movement of the cutting bits 30 on the respective tapered surfaces 25 will be described below.

Figure 3:
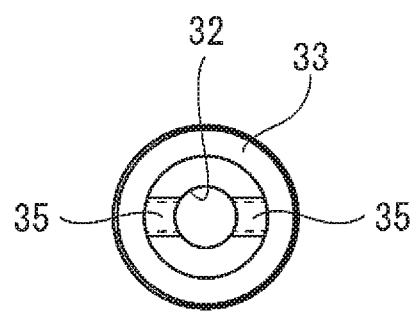
FIG. 3 is a view of a cutter of FIG. 1 as seen in an X2 direction.

The cutter 3 is configured such that elastically deformable two leg pieces 31 substantially parallel to each other protrude forward from the front end portion of a cutter body 34, in which the aforementioned through-hole 32 is formed. The aforementioned cutting bits 30 are provided on the front end portions of the respective leg pieces 31. The cutter body 34 includes a flange-shaped stopper 33 provided on the side surface of the rear end portion of the cutter body 34. The role of the stopper 33 will be described below. Protrusions 35 protrude rearward from a circumferential edge of the rear end portion of the cutter body 34 (see FIG. 3). A recess 41, in which the protrusions 35 are fitted, is formed in the front end portion of the shank 4. The cutter 3 and the shank 4 are coupled together as a result of the protrusions 35 being fitted in the recess 41 (see FIG. 4).

The shank 4 includes two elongated holes 42 formed in the side surface of the shank 4. The two elongated holes 42 are elongated in the forward-rearward direction, and overlap the through-hole 20. The two elongated holes 42 are formed symmetrically with respect to the longitudinal axis L. The shaft 2 is passed through the through-hole 32 of the cutter 3 and inserted in the insertion hole 40 of the shank 4, and in this state, a fixing pin 6 is inserted in the elongated holes 42 and the through-hole 20 from the outside of the shank 4. The through-hole 20 is formed such that the diameter thereof is slightly greater than the diameter of the fixing pin 6. The width of each elongated hole 42 is also slightly greater than the diameter of the fixing pin 6. Accordingly, the fixing pin 6 is passed through one of the elongated holes 42 and the through-hole 20, and is then fitted in the other elongated hole 42. In a state where the fixing pin 6 is fitted in the through-hole 20, the shank 4 and the cutter 3 are movable in the forward-rearward direction within the range of a length Z1, which is the length of the elongated holes 42 in the forward-rearward direction. As a result of the fixing pin 6 being fitted to the shaft 2 and shank 4, the shaft 2, the shank 4, and the cutter 3 coupled to the shank 4 rotate together about the longitudinal axis L.

A compression spring 5 is provided between the insertion hole 40 of the shank 4 and the spring receiving hole 21 of the shaft 2. The compression spring 5 biases the shaft 2 forward, and biases the shank 4 rearward. That is, the shaft 2 and the shank 4 are biased in the opposite directions by the compression spring 5.

Figure 4:
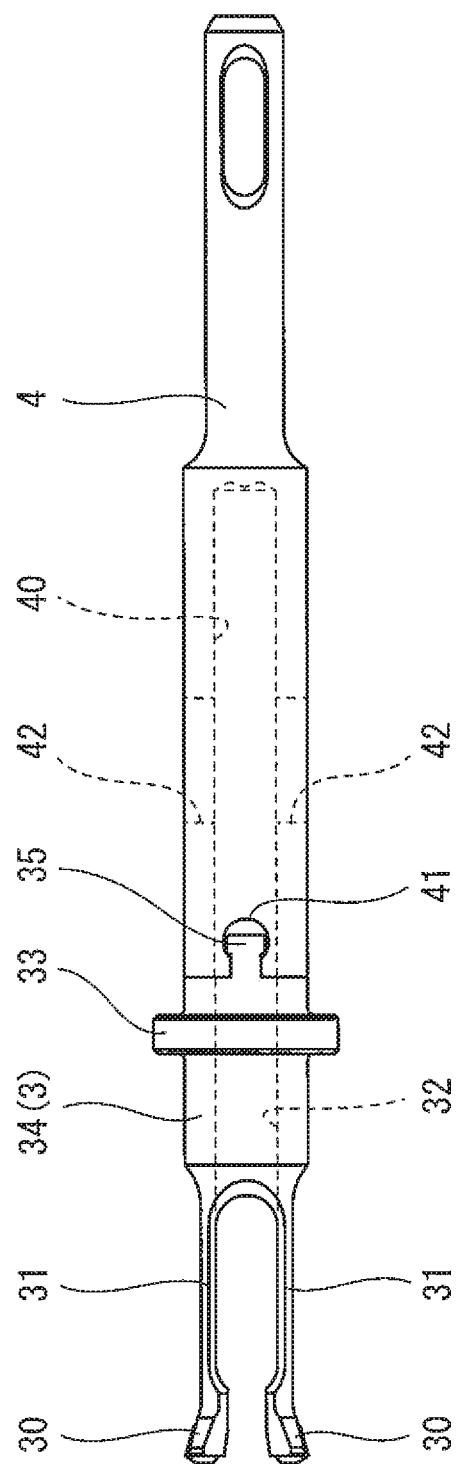
FIG. 4 is a side view showing a state where the cutter and a shank are coupled together.

The hole drilling device 1 is assembled in the following steps. As shown in FIG. 4, the protrusions 35 are fitted in the recess 41, and thereby the cutter 3 and the shank 4 are coupled together. The shaft 2 with the compression spring 5 inserted in the spring receiving hole 21 (see FIG. 1) is inserted in the cutter 3 and the shank 4 through the through-hole 32 and the insertion hole 40. The shaft 2 is moved rearward against the compression spring 5, such that the elongated holes 42 coincide with the through-hole 20. The fixing pin 6 is passed through the through-hole 20 and the elongated holes 42, and then the moving of the shaft 2 rearward is stopped. Due to the biasing force of the compression spring 5, the fixing pin 6 is pressed against the front end portion of each elongated hole 42, and thus the hole drilling device 1 is fully assembled.

FIGS. 5A and 5B are partially cutaway side views of the hole drilling device 1. FIG. 5A shows the hole drilling device 1 in an unused state, whereas FIG. 5B shows the state of the hole drilling device 1 at the time of forming the expanded-diameter hole portion 90. As previously described, the compression spring 5 biases the shaft 2 forward, and biases the cutter 3 and the shank 4 rearward. Accordingly, when the hole drilling device 1 is in the unused state, the cutting bits 30 of the cutter 3 are positioned on the rear end portions of the respective tapered surfaces 25 of the shaft 2. In this state, the distance between the two cutting bits 30 is less than the diameter of the opening of the mounting hole 9. Accordingly, the hole drilling device 1 can be inserted into the mounting hole 9.

From the unused state shown in FIG. 5A, the shank 4 is pushed in forward against the compression spring 5. At the time, the cutter 3 coupled to the shank 4 also moves forward. Since the leg pieces 31 are elastically deformable, when the cutter 3 moves forward, the cutting bits 30 slide forward on the respective tapered surfaces 25. As a result, the front end portions (distal end portions) of the two respective leg pieces 31 spread away from each other. As shown in FIG. 5B, when the cutting bits 30 come into contact with the front end portions of the respective tapered surfaces 25, the cutting bits 30 protrude laterally from the respective tapered surfaces 25. Specifically, when the hole drilling device 1 in the unused state is inserted into the mounting hole 9, and the shank 4 in a rotating state is pushed in forward, the two cutting bits 30 rotate while spreading away from each other. As a result, the expanded-diameter hole portion 90 is formed at the inner bottom part of the mounting hole 9.

FIGS. 6A and 6B are partially cutaway side views of the hole drilling device 1. FIG. 6A shows the hole drilling device 1 inserted in the mounting hole 9, whereas FIG. 6B shows a state where the formation of the expanded-diameter hole portion 90 has been completed. As shown in FIG. 6A, when the contact surface 23 of the shaft 2 is in contact with the inner bottom of the mounting hole 9, the shaft 2 is unable to move forward any further. At the time, the stopper 33 and the surface of the drilling object 91 are away from each other by a distance P. This state is hereinafter referred to as a first position of the stopper 33.

The distance P is set to be equal to a distance by which the cutter 3 moves forward in order to form the expanded-diameter hole portion 90. Specifically, since the distance in the forward-rearward direction from the contact surface 23 to the stopper 33 when the hole drilling device 1 is in the unused state is known (i.e., distance Q indicated in FIG. 5A), the mounting hole 9 is formed in advance to a depth of Q-P, such that the surface of the drilling object 91 is away from the stopper 33 by the distance P.

As previously mentioned, the shank 4 and the cutter 3 are movable in the forward-rearward direction within the range of the length Z1, which is the length of the elongated holes 42 in the forward-rearward direction (see FIG. 1). Therefore, the length Z1 in the forward-rearward direction is set to be longer than the distance P.

A rotation motor 7 is connected to the rear end portion of the shank 4, and the power to the rotation motor 7 is turned on. While rotating the shank 4 and the cutter 3 about the longitudinal axis L, the shank 4 and the cutter 3 are moved forward against the compression spring 5 by the distance P. As shown in FIG. 6B, the stopper 33 comes into contact with the surface of the drilling object 91. This state is hereinafter referred to as a second position of the stopper 33. The two cutting bits 30 rotate while spreading away from each other along the respective tapered surfaces 25. As a result, the expanded-diameter hole portion 90 is formed at the inner bottom part of the mounting hole 9. It should be noted that although the contact surface 23 of the shaft 2 also rotates, the rotating contact surface 23 merely rubs against the inner bottom surface of the mounting hole 9, and does not affect the hole drilling.

When looking at the stopper 33 being in contact with the surface of the drilling object 91, a worker recognizes that the shank 4 and the cutter 3 have been pushed in by the distance P, and that the expanded-diameter hole portion 90 has been formed. The worker turns off the power to the rotation motor 7 to stop the rotation of the shank 4 and the cutter 3, and also, the worker stops pushing in the shank 4 and the cutter 3. The shank 4 and the cutter 3 are biased rearward by the restoring force of the compression spring 5, and the cutting bits 30 reach the rear end portions of the respective tapered surfaces 25. The hole drilling device 1 returns to the unused state shown in FIG. 5A, allowing the worker to be able to pull the hole drilling device 1 out of the mounting hole 9.

According to the hole drilling device 1 of the present embodiment, in the second position, in which the stopper 33 is in contact with the surface of the drilling object 91, it is recognized that the cutting bits 30 of the cutter 3 have protruded laterally from the respective tapered surfaces 25, and that the expanded-diameter hole portion 90 has been formed. Since the stopper 33 being in contact with the surface of the drilling object 91 is visually recognizable, the worker performing the hole drilling work can readily visually check from the outside of the drilling object 91 whether or not the expanded-diameter hole portion 90 has been formed. Consequently, the efficiency of the hole drilling work for forming the expanded-diameter hole portion 90 is improved.

It should be noted that the cutter 3 and the shank 4 may be integrated together. In the present embodiment, the cutter 3 and the shank 4 are separate components. The reason for this is that the cutter 3 tends to wear quickly when the hole drilling is performed repeatedly, and if the cutter 3 and the shank 4 are separate components, the cutter 3 that has worn can be readily replaced with a new one.

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially altered without departing from the spirit of the present invention.

INDUSTRIAL APPLICABILITY

The present invention is useful when applied to a hole drilling device for forming an expanded-diameter hole portion.

REFERENCE CHARACTER LIST 1 hole drilling device
2 shaft
3 cutter
4 shank
5 compression spring
6 fixing pin
9 mounting hole
25 tapered surface
30 cutting bit
33 stopper

The invention claimed is:

1. A hole drilling device for forming an expanded-diameter hole portion at an inner bottom part of a bottomed mounting hole formed in a drilling object, the hole drilling device comprising:
   a shaft including a contact surface and a tapered surface, the contact surface being formed on a front end portion of the shaft and coming into contact with the inner bottom part of the mounting hole, the tapered surface being formed on a side surface of the front end portion of the shaft and expanding toward the contact surface;
   a cutter including a cutting bit formed on a front end portion of the cutter, the cutter being externally attached to the shaft such that the cutter is slidable in a forward-rearward direction, the cutting bit being guided by the tapered surface and protruding laterally from the tapered surface when the cutter slides forward along the shaft;

a shank coupled to the cutter and externally attached to the shaft, such that the shank is slidable in the forward-rearward direction; and a biasing element provided between the shank and the shaft, the biasing element configured to bias the shaft forward, wherein the cutter includes a stopper provided on a side surface of a rear end portion of the cutter, the stopper coming into contact with a surface of the drilling object when the cutter slides forward along the shaft, and a diameter of the stopper is formed to be larger than a diameter of a front end portion of the shank.

2. The hole drilling device according to claim 1, wherein the cutter is movable between a first position and a second position, when the cutter is in the first position, the contact surface of the shaft is in contact with the inner bottom part of the mounting hole, and the stopper is away from the surface of the drilling object, and when the cutter is in the second position, the cutter has been pushed in forward from the first position, the cutting bit has protruded laterally from the tapered surface, and the stopper is in contact with the surface of the drilling object.

3. The hole drilling device according to claim 2, wherein when the cutter is in the first position, the shank and the cutter are biased rearward by the biasing element, and the stopper is away from the surface of the drilling object, and when the shank and the cutter are pushed in forward from the first position against the biasing element, the cutter reaches the second position.

4. The hole drilling device according to claim 3, wherein the shaft includes a through-hole formed in a side surface of the shaft, the through-hole extending orthogonally to a longitudinal axis of the shaft, the shank includes an elongated hole formed in a side surface of the shank, the elongated hole being elongated in the forward-rearward direction and overlapping the through-hole, the hole drilling device comprises a fixing pin that is passed through the through-hole of the shaft and fitted in the elongated hole of the shank, when the cutter is in the first position, the fixing pin is in contact with a front end portion of the elongated hole, and when the cutter is in the second position, the fixing pin is spaced apart rearward from the front end portion of the elongated hole.

5. The hole drilling device according to claim 4, wherein the cutter and the shank are integrated together.

6. The hole drilling device according to claim 1, wherein the cutter and the shank are integrated together.

* * * * *